United States Patent
Devta et al.

(10) Patent No.: US 11,546,413 B2
(45) Date of Patent: Jan. 3, 2023

(54) SYSTEM AND METHOD FOR IDENTIFYING CAPABILITIES AND LIMITATIONS OF AN ORCHESTRATION BASED APPLICATION INTEGRATION

(71) Applicant: ORACLE INTERNATIONAL CORPORATION, Redwood Shores, CA (US)

(72) Inventors: Prakash Kumar Devta, Bangalore (IN); Srimant Misra, Bangalore (IN); Ankur Prakash, Bangalore (IN); Dinesh Chandra Pant, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/731,576

(22) Filed: Dec. 31, 2019

(65) Prior Publication Data
US 2021/0203714 A1    Jul. 1, 2021

(51) Int. Cl.
| H04L 67/10 | (2022.01) |
| G06F 9/50 | (2006.01) |
| G06F 9/54 | (2006.01) |
| H04L 67/00 | (2022.01) |

(52) U.S. Cl.
CPC ............ *H04L 67/10* (2013.01); *G06F 9/5072* (2013.01); *G06F 9/541* (2013.01); *H04L 67/34* (2013.01)

(58) Field of Classification Search
CPC ....... H04L 67/10; H04L 67/34; G06F 9/5072; G06F 9/541
See application file for complete search history.

(56) References Cited

U.S. PATENT DOCUMENTS

| 10,521,223 | B1* | 12/2019 | Bogushefsky, III ................. G06F 9/45504 |
| 2003/0018832 | A1* | 1/2003 | Amirisetty .............. G06F 9/465 719/328 |
| 2006/0155873 | A1* | 7/2006 | Twata ...................... H04L 45/00 709/240 |
| 2008/0082569 | A1* | 4/2008 | Mansour ................ G06Q 10/10 707/999.102 |
| 2009/0171720 | A1* | 7/2009 | Crook .................... G06Q 40/02 705/35 |
| 2010/0161629 | A1* | 6/2010 | Palanisamy ........... G06F 16/972 707/769 |

(Continued)

*Primary Examiner* — Jonathan A Bui
*Assistant Examiner* — Zonghua Du
(74) *Attorney, Agent, or Firm* — Tucker Ellis LLP (57) ABSTRACT

In accordance with an embodiment, described herein are systems and methods identifying capabilities and limitations of an orchestration based application integration. The systems and methods described herein can detect and publish/expose such a set of limitations and capabilities of the adapters/connectors to the integration platform. In this way, such metadata can be used, for example, by a user of an integration system in designing an integration of applications, or in selecting an orchestration, based upon, e.g., the published metadata that indicates the capabilities of the individual adapters/connectors, or the orchestration as a whole (or parts thereof). This way, once an orchestration is active for processing requests, then it can also publish a metadata considering the metadata of involved adapters. This metadata can be used in adjusting requests to an integration.

14 Claims, 6 Drawing Sheets

(56) References Cited

U.S. PATENT DOCUMENTS

| | | | |
|---|---|---|---|
| 2012/0030689 A1* | 2/2012 | Li | G06F 9/541 |
| | | | 719/313 |
| 2016/0092475 A1* | 3/2016 | Stojanovic | G06F 16/2379 |
| | | | 707/805 |
| 2017/0126512 A1* | 5/2017 | Seed | H04L 67/51 |
| 2019/0188006 A1* | 6/2019 | Ritter | G06F 8/38 |
| 2020/0167141 A1* | 5/2020 | Kulkarni | G06F 8/61 |
| 2021/0075749 A1* | 3/2021 | Viswanathan | G06N 20/00 |

* cited by examiner

SYSTEM AND METHOD FOR IDENTIFYING CAPABILITIES AND LIMITATIONS OF AN ORCHESTRATION BASED APPLICATION INTEGRATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related integration cloud services, and in particular, identifying capabilities and limitations of an orchestration based application integration.

BACKGROUND

Integration cloud services (ICS) (e.g., Oracle Integration Cloud Service) are simple and powerful integration platforms in the cloud that assist in the utilization of products, such as Software as a Service (SaaS) and on-premises applications. ICS can be provided as an integration platform as a service (iPaas) and can include a web based integration designer for point and click integration between applications, a rich monitoring dashboard that provides real-time insight into the transactions.

SUMMARY

In accordance with an embodiment, described herein are systems and methods identifying capabilities and limitations of an orchestration based application integration. The systems and methods described herein can detect and publish/ expose such a set of limitations and capabilities of the adapters/connectors to the integration platform. In this way, such metadata can be used, for example, by a user of an integration system in designing an integration of applications, or in selecting an orchestration, based upon, e.g., the published metadata that indicates the capabilities of the individual adapters/connectors, or the orchestration as a whole (or parts thereof). This way, once an orchestration is active for processing requests, then it can also publish a metadata considering the metadata of involved adapters. This metadata can be used to adjust requests to an integration.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Integration platform as a service, for example, Oracle Integration Cloud Service (ICS), can provide a cloud-based platform for building and deploying integrations flows that connect applications residing in the cloud or on-premises.

Integration Cloud Service

Figure 1:
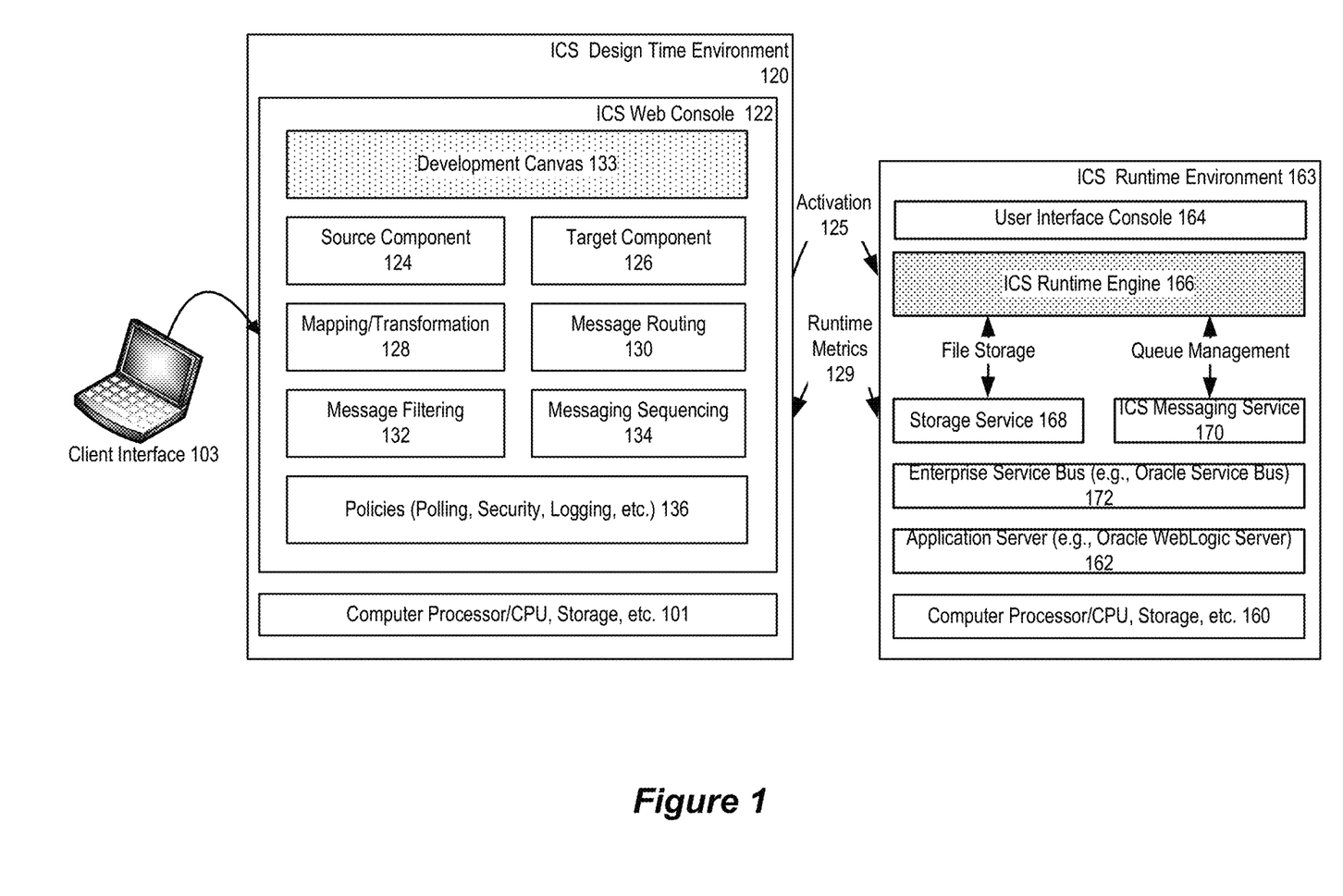
FIG. 1 illustrates an integration cloud service in accordance with an embodiment.

FIG. 1 illustrates an ICS platform for designing and executing an ICS integration flow, in according with an embodiment.

As shown in FIG. 1, the ICS platform can include a design-time environment 120, and a runtime environment 163. Each environment can execute on a computer including one or more processors, for example a computer 101 or 106.

In accordance with an embodiment, the design-time environment includes an ICS web console 122, which provides a browser-based designer to allow an integration flow developer to build integrations using a client interface 103.

In accordance with an embodiment, the ICS design-time environment can be pre-loaded with connections to various SaaS applications or other applications, and can include a source component 124, and a target component 126. The source component can provide definitions and configurations for one or more source applications/objects; and the target component can provide definitions and configurations for one or more target applications/objects. The definitions and configurations can be used to identify application types, endpoints, integration objects and other details of an application/object.

As further shown in FIG. 1, the design-time environment can include a mapping/transformation component 128 for mapping content of an incoming message to an outgoing message, and a message routing component 130 for controlling which messages are routed to which targets based on content or header information of the messages. Additionally, the design-time environment can include a message filtering component 132, for controlling which messages are to be routed based on message content or header information of the messages; and a message sequencing component 134, for rearranging a stream of related but out-of-sequence messages back into a user-specified order.

In accordance with an embodiment, each of the above of the described components, as with the source and target components, can include design-time settings that can be persisted as part of a flow definition/configuration.

In accordance with an embodiment, a flow definition specifies the details of an ICS integration flow; and encompasses both the static constructs of the integration flow (for example, message routers), and the configurable aspects (for example, routing rules). A fully configured flow definition and other required artifacts (for example, jca and .wsdl files) in combination can be referred to as an ICS project. An ICS project can fully define an integration flow, and can be implemented by an underlying implementation layer.

In accordance with an embodiment, a policies component 136 can include a plurality of policies that govern behaviors of the ICS environment. For example, a polling policy can be configured for source-pull messaging interactions (i.e. query style integrations) for a source application, to invoke an outbound call to the source application via a time-based polling.

In accordance with an embodiment, other policies can be specified for security privileges in routing messages to a target application; for logging message payloads and header fields during a flow execution for subsequent analysis via a monitoring console; and for message throttling used to define a number of instances that an enterprise service bus (ESB) service can spawn to accommodate requests. In addition, policies can be specified for monitoring/tracking an integration flow at a flow level; and for validating messages being processed by the ICS platform against a known schema.

In accordance with an embodiment, an integration developer can drag and drop a component on a development canvas 133 for editing and configuration, for use in designing an integration flow.

As further shown, the runtime environment can include an application server 162, an ICS runtime engine 166, a storage service 168 and a messaging service 170 on top of an enterprise service bus component 172. A user interface console 164 can be used to monitor and track performance of the runtime environment.

Figure 2:
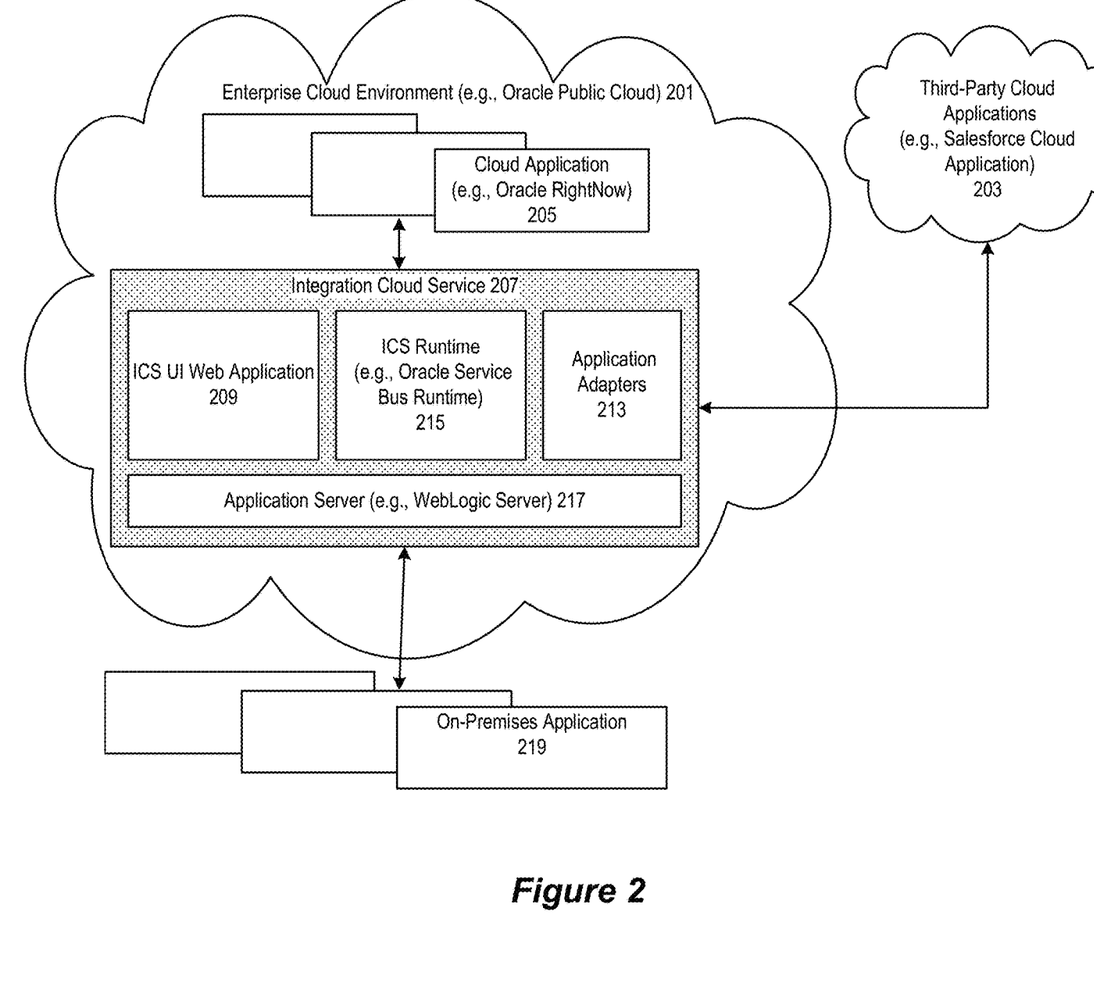
FIG. 2 illustrates an integration cloud service in accordance with an embodiment.

FIG. 2 illustrates an integration cloud service in accordance with an embodiment.

As shown in FIG. 2, an ICS 207 can provide a cloud-based integration service for designing, executing, and managing ICS integration flows. The ICS can include a web application 209 and an ICS runtime 215 executing on an application server 217 in an enterprise cloud environment (for example, Oracle Public Cloud) 201. The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters 213 can be provided to simplify the task of configuring connections to a plurality of applications, by handling the underlying complexities of connecting to those applications. The applications can include enterprise cloud applications of the ICS vendor 205, third-party cloud applications (for example, Salesforce) 103, and on-premises applications 219. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web UI application, including data mapping integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a predefined messaging service. In a subscribing integration flow, a target application or service can be configured to subscribe to messages from the ICS through the messaging service.

Figure 3:
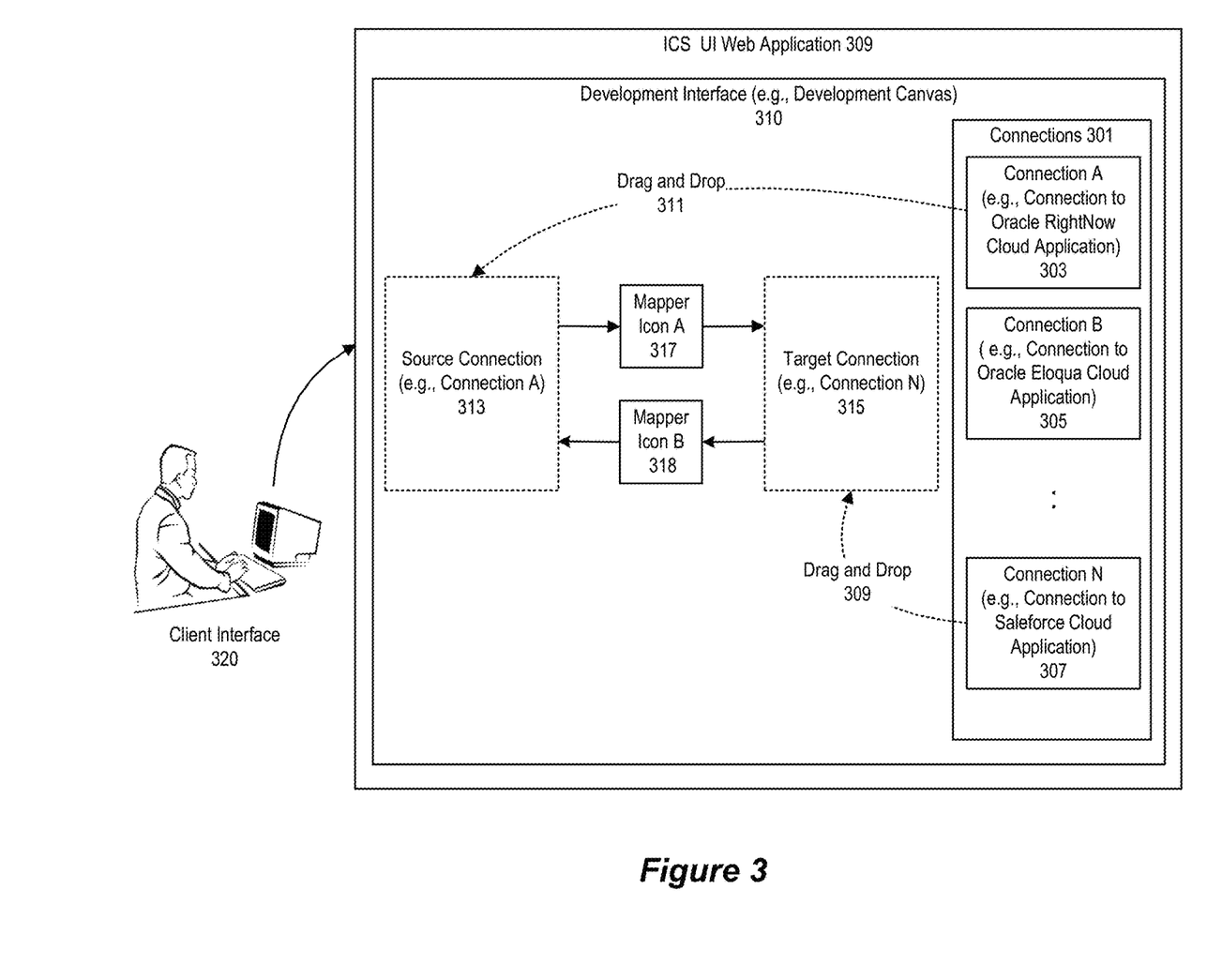
FIG. 3 illustrates an ICS design time, in accordance with an embodiment.

FIG. 3 illustrates an ICS design time, in accordance with an embodiment.

In accordance with an embodiment, a development interface (e.g., a development canvas) 310 in the web UI application can be used by a user 320 to create an ICS integration flow, using a plurality of existing connections 301, for example, connection A 303, connection B 305 and connection N 307.

As shown in FIG. 3, a particular connection (for example, connection A) can be dragged and dropped 311 to the development interface as a source connection 313, and connection N can be dragged and dropped 309 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

Identifying Capabilities of Orchestration Based Application Integration

In accordance with an embodiment, an integration of applications consists of multiple applications working together in an orchestration. Generally, an orchestration platform (also known as the integration platform) provides ways to interact with these applications with the help of client applications. These client applications are called connectors or adapters.

In accordance with an embodiment, some or all of the connectors or adapters can be associated with metadata. This metadata can comprise static metadata and/or dynamic metadata. Static metadata is metadata that is associated with each of the connectors or adapters independently of any associated application (e.g., an on-premise application). An example of such static metadata can be the size of a file that the adapter or connector is able to process (e.g., 1 GB, 100 MB, 10 MB . . . etc.).

In accordance with an embodiment, when linked to an application, a connector or adapter can additionally be associated with dynamic metadata. Such dynamic metadata is inferred based upon the adapter or connector's association or linking with an application outside of the orchestration (e.g., an on-premise application that is associated with a connector or adapter). Such dynamic metadata can comprise, for example, a throughput that the connector or adapter is able to process based upon an instance of a linked/associated application. Dynamic metadata can vary, for example, from orchestration to orchestration based upon, for example, the unique instance of an application to which the connector or adapter is linked.

In accordance with an embodiment, the systems and methods described herein can detect and publish/expose such standard set of limitations and capabilities of the adapters/connectors to the integration platform. In this way, such metadata can be used, for example, by a user of an integration system in designing an integration of applications, or in selecting an orchestration, based upon, e.g., the published metadata that indicates the capabilities of the individual adapters/connectors, or the orchestration as a whole (or parts thereof). This way, once an orchestration is active for processing requests, then it can also publish a metadata considering the metadata of involved adapters. This metadata can be used in adjusting requests to an integration.

Figure 4:
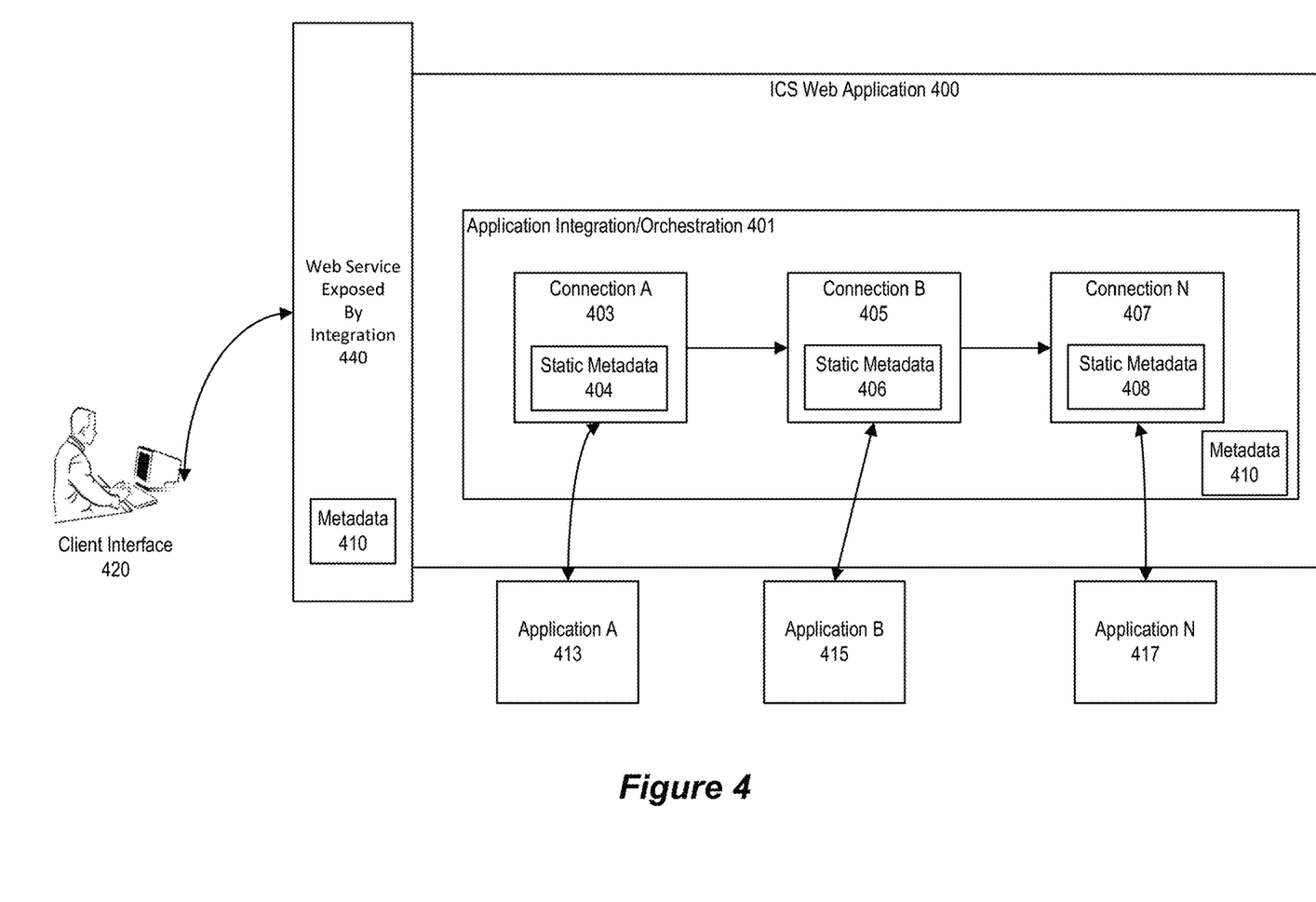
FIG. 4 illustrates a system for identifying capabilities and limitations of an orchestration based application integration, in accordance with an embodiment.

FIG. 4 illustrates a system for identifying capabilities and limitations of an orchestration based application integration, in accordance with an embodiment.

In accordance with an embodiment, an ICS Web Application 400 can comprise an application integration/orchestration 401 tool that can be used to design or run an orchestration, such as the orchestration comprising connection A 403, connection B 405, and connection N 407. Each of the connections can be associated with or linked with an application, such as applications A-N, 415-417, as shown in the figure.

In accordance with an embodiment, a user, via a client interface 420, can be access a web service exposed by an integration 440. Via this web service, the user can interact with the application integration to, for example, design, test, or run orchestrations, such as orchestration 401.

In accordance with an embodiment, each of the connections, connection A-N, can be associated with a set of metadata, such as metadata 404, 406, and 408. Each set of metadata can comprise one or both of static metadata and dynamic metadata, as discussed above. In the displayed embodiment, each set of metadata 404, 406, and 408 comprise static metadata.

In accordance with an embodiment, the orchestration 401 shown in the figure can be associated with metadata 410 (which can be exposed/published to the client interface via the web service 440). Such metadata 410 can comprise a total metadata profile for the orchestration, which can, for example, represent a lowest common denominator for the orchestration, as well as other attributes and capabilities of the complete orchestration.

In accordance with an embodiment, for example, suppose that there is an integration involving 3 connectors say A, B and N. Connector A, via metadata, can process files up to 1 GB in size. Connector B can process 100 MB files, and connector N can process files up to 10 MB in size. Based on the arrangement of these connectors in the orchestration, the orchestration can publish a metadata (e.g., metadata 410) that indicates that the orchestration can process files only up to 10 MB in size (10 MB files being the lowest common denominator between the metadata of the three connectors).

Figure 5:
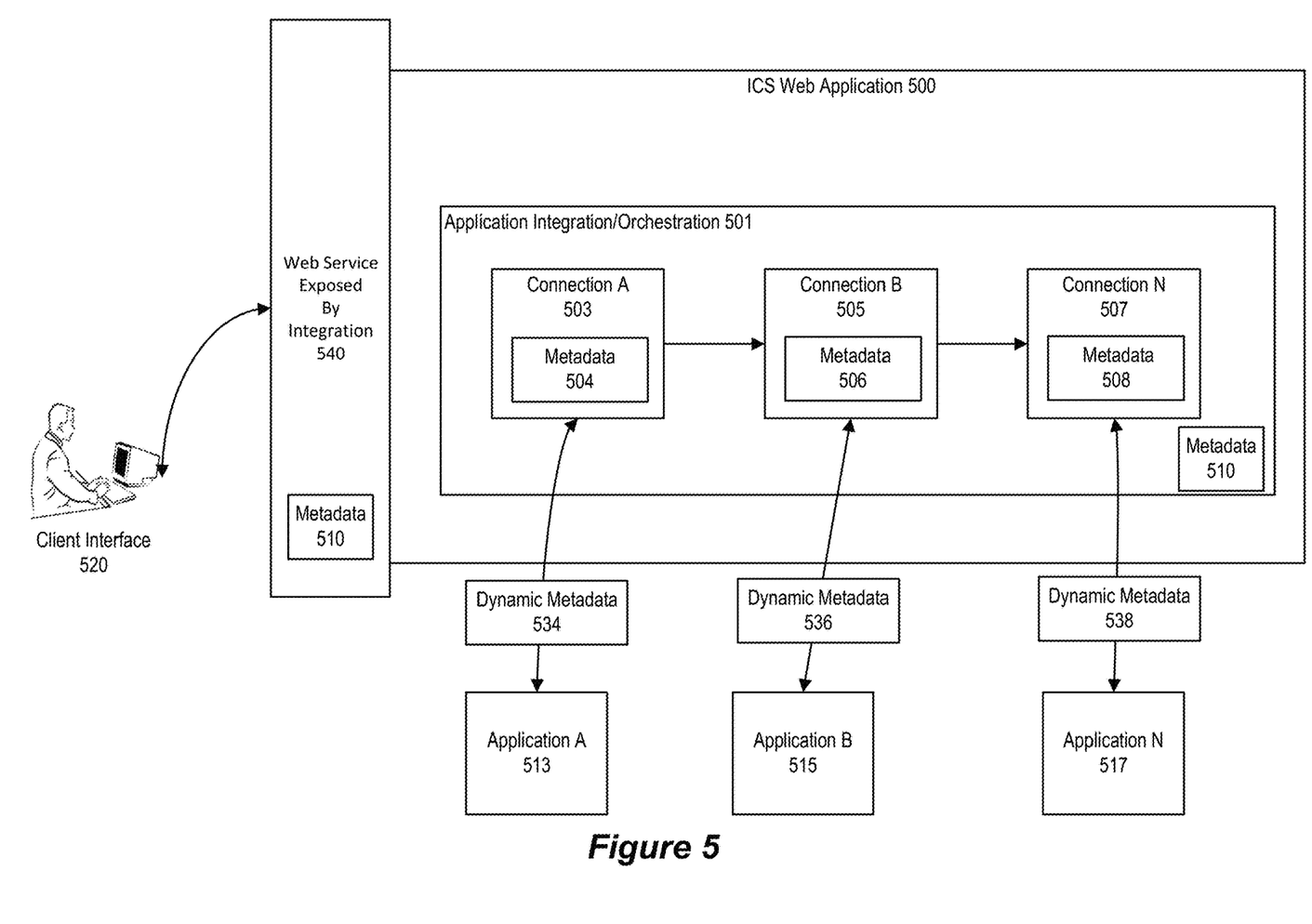
FIG. 5 illustrates a system for identifying capabilities and limitations of an orchestration based application integration, in accordance with an embodiment.

FIG. 5 illustrates a system for identifying capabilities and limitations of an orchestration based application integration, in accordance with an embodiment.

In accordance with an embodiment, an ICS Web Application 500 can comprise an application integration/orchestration 501 tool that can be used to design or run an orchestration, such as the orchestration comprising connection A 503, connection B 505, and connection N 507. Each of the connections can be associated with or linked with an application, such as applications A-N, 515-517, as shown in the figure.

In accordance with an embodiment, a user, via a client interface 520, can be access a web service exposed by an integration 540. Via this web service, the user can interact with the application integration to, for example, design, test, or run orchestrations, such as orchestration 501.

In accordance with an embodiment, each of the connections, connection A-N, can be associated with a set of metadata, such as metadata 504, 506, and 508. Each set of metadata can comprise one or both of static metadata and dynamic metadata, as discussed above. In an embodiment, the sets of metadata 504, 506, and 508 comprise dynamic metadata that is gathered by the connection/link each connection has with an application, 513, 515, and 517. Such dynamic metadata is shown in the figure as 534, 536, and 538.

In accordance with an embodiment, the sets of metadata 504, 506, and 508 can, in addition to comprising the dynamic metadata 534, 536, and 538, can additionally comprise static metadata that is inferred from the respective connector itself.

In accordance with an embodiment, the orchestration 501 shown in the figure can be associated with metadata 510 (which can be exposed/published to the client interface via the web service 540). Such metadata 510 can comprise a total metadata profile for the orchestration, which can, for example, represent a lowest common denominator for the orchestration, as well as other attributes and capabilities of the complete orchestration.

In accordance with an embodiment, for example, suppose that there is an integration involving 3 connectors say A, B and N. Connector A, via metadata, can process files up to 1 GB in size. Connector B can process 100 MB files, and connector N can process files up to 10 MB in size. Based on the arrangement of these connectors in the orchestration, the orchestration can publish a metadata (e.g., metadata 510)

that indicates that the orchestration can process files only up to 10 MB in size (10 MB files being the lowest common denominator between the metadata of the three connectors).

In accordance with an embodiment, as another example, each of the metadata 504, 506, and 508 can be associated with dynamic metadata 534, 536, and 538 that is populated based upon the association/linking of each connection with each associated instance of an application, such as Applications A, B, and N. Such dynamic metadata can be updated, for example, upon a change in instance of application, or upon a change in associated properties of each running application (e.g., Application A's bandwidth increasing from 5 MB/s to 10 MB/s). Such an update to dynamic metadata can, in turn, update the orchestration's metadata 510 in a corresponding fashion, where applicable.

In accordance with an embodiment, below are some exemplary use cases of the systems and methods described herein:

- Clients and/or client applications can base decisions on the exposed metadata of the integration/orchestration.
- There can be multiple integrations with same functionality but different values for exposed metadata parameters. Client applications can decide to use one of the integrations based on the exposed metadata parameter values. As the metadata itself can be dynamic, the client application can switch to use a different integration. This can be thought of as an orchestration of integrations based on exposed metadata values.
- With the help of static metadata exposed by adapters during design time of integration, an integration developer can be aware of and select a connector/adapter based upon the exposed metadata. In this way, the developer can be aware of particular usecases, and whether a desired usecase is possible or not, without running various scenarios. For example, an integration developer might be interested in handling large files in the integration and if one of the activities/adapter doesn't support large files, then this will show up in the exposed metadata of the integration as the maximum file size that can be processed by this integration.
- Metadata of the adapters can be indexed and searched. This will help find the right adapter for the usecase.
- Metadata can be used as a standard to compare and rank adapters.
- A business can decide to show limited set of parameters or standard values for general customers. These values can be changed or updated based on the quality of service agreement or version of application or license terms.
- As integrations themselves publish metadata of their own, a developer can create orchestration of integrations and the same concept will apply. That is, when each integration is associated with a set of metadata, integrations can be combined based upon the exposed sets of metadata.

Figure 6:
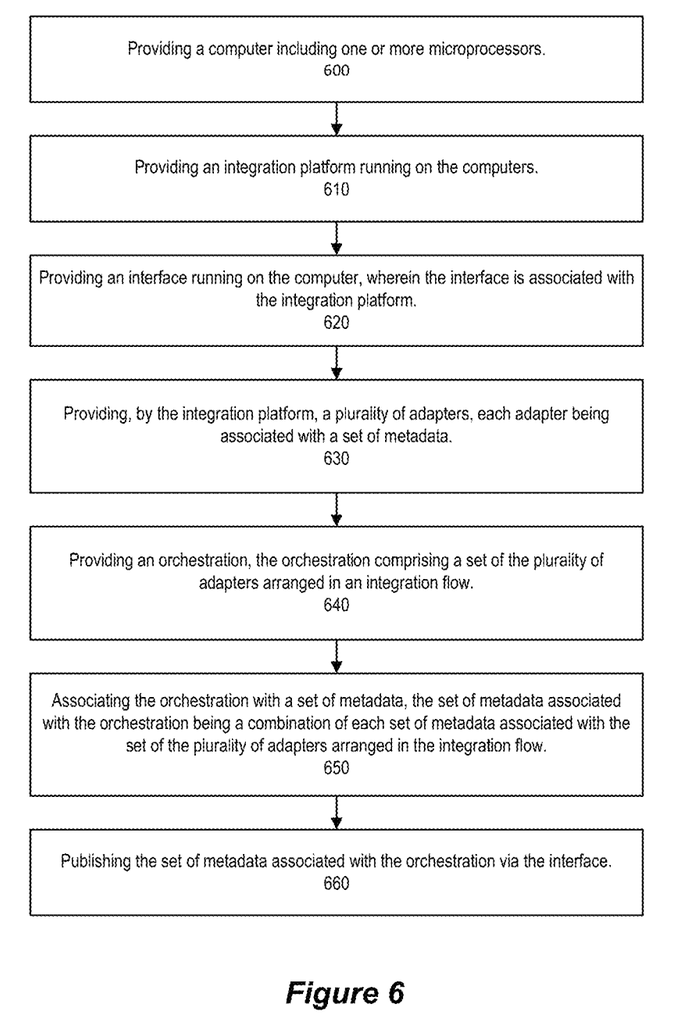
FIG. 6 is a flow chart of a method for identifying capabilities and limitations of an orchestration based application integration, in accordance with an embodiment.

FIG. 6 is a flow chart of a method for identifying capabilities and limitations of an orchestration based application integration, in accordance with an embodiment.

In accordance with an embodiment, at step 600, the method can provide a computer including one or more microprocessors.

In accordance with an embodiment, at step 610, the method can provide an integration platform running on the computer.

In accordance with an embodiment, at step 620, the method can provide an interface running on the computer, wherein the interface is associated with the integration platform.

In accordance with an embodiment, at step 630, the method can provide, by the integration platform, a plurality of adapters, each adapter being associated with a set of metadata;

In accordance with an embodiment, at step 640, the method can provide an orchestration, the orchestration comprising a set of the plurality of adapters arranged in an integration flow;

In accordance with an embodiment, at step 650, the method can associate the orchestration with a set of metadata, the set of metadata associated with the orchestration being a combination of each set of metadata associated with the set of the plurality of adapters arranged in the integration flow.

In accordance with an embodiment, at step 660, the method can publish the set of metadata associated with the orchestration via the interface.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for identifying capabilities and limitations of an orchestration based application integration, comprising:
   a computer including one or more microprocessors;
   an integration platform running on the computer; and
   an interface running on the computer, wherein the interface is associated with the integration platform;
   wherein the integration platform provides a plurality of adapters, each adapter being associated, respectively, with a set of metadata, each set of metadata indicating at least one capability of the respective adapter;
   wherein an orchestration is provided, the orchestration comprising two or more of the plurality of adapters arranged in an integration flow;
   wherein each adapter of the two or more of the plurality of adapters is associated respectively with an instance of an application of a plurality of applications, each of the applications being external to the orchestration;
   wherein the orchestration is associated with a combined set of metadata, the combined set of metadata associated with the orchestration being a combination of each respective set of metadata associated with each of the adapters of the two or more of the plurality of adapters arranged in the integration flow, the combined set of metadata indicating at least one limitation of the integration flow, the at least one limitation being based upon a lowest common denominator between the combination of each respective set of metadata associated with the two or more of the plurality of adapters arranged in the integration flow;
   wherein the combined set of metadata associated with the orchestration is published via the interface;
   wherein a change in a set of metadata associated with a first adapter of the two or more of the plurality of adapters is detected, the change being detected in a dynamic metadata of the set of metadata of the first adapter of the two or more of the plurality of adapters, the change being based upon an update to a capability of an instance of an application associated with the first adapter of the two or more of the plurality of adapters; and
   wherein, based upon the detection of the change in the set of metadata associated with the first adapter of the two or more of the plurality of adapters, the combined set of metadata is updated and republished via the interface.

2. The system of claim 1, wherein the set of metadata associated with the first adapter of the two or more of the plurality of adapters further comprises static metadata.

3. The system of claim 2, wherein the static metadata is indicative of at least one capability of the first adapter.

4. The system of claim 3, wherein a second set of metadata associated with a second adapter of the two or more of the plurality of adapters comprises static metadata and dynamic metadata.

5. The system of claim 4, wherein the static metadata associated with the second adapter of the two or more of the plurality of adapters is indicative of at least one capability of the second adapter, and wherein the dynamic metadata associated with the second adapter of the two or more of the plurality of adapters is indicative of at least one capability of an application associated with the second adapter.

6. A method for identifying capabilities and limitations of an orchestration based application integration, comprising:
- providing a computer including one or more microprocessors;
- providing an integration platform running on the computer;
- providing an interface running on the computer, wherein the interface is associated with the integration platform;
- providing, by the integration platform, a plurality of adapters, each adapter being associated, respectively, with a set of metadata, each set of metadata indicating at least one capability of the respective adapter;
- providing an orchestration, the orchestration comprising two or more of the plurality of adapters arranged in an integration flow, wherein each adapter of the two or more of the plurality of adapters is associated respectively with an instance of an application of a plurality of applications, each of the applications being external to the orchestration;
- associating the orchestration with a combined set of metadata, the combined set of metadata associated with the orchestration being a combination of each respective set of metadata associated with each of the adapters of the two or more of the plurality of adapters arranged in the integration flow, the combined set of metadata indicating at least one limitation of the integration flow, the at least one limitation being based upon a lowest common denominator between the combination of each respective set of metadata associated with the two or more of the plurality of adapters arranged in the integration flow;
- publishing the combined set of metadata associated with the orchestration via the interface;
- detecting a change in a set of metadata associated with a first adapter of the two or more of the plurality of adapters, the change being detected in a dynamic metadata of the set of metadata of the first adapter of the two or more of the plurality of adapters, the change being based upon an update to a capability of an instance of an application associated with the first adapter of the two or more of the plurality of adapters;
- based upon the detection of the change in the respective set of metadata associated with the first adapter of the two or more of the plurality of adapters, updating the combined set of metadata; and
- republishing the updated combined set of metadata via the interface.

7. The method of claim 6, wherein the set of metadata associated with the first adapter of the two or more of the plurality of adapters further comprises static metadata.

8. The method of claim 7, wherein the static metadata is indicative of at least one capability of the first adapter.

9. The method of claim 8, wherein a second set of metadata associated with a second adapter of the two or more of the plurality of adapters comprises static metadata and dynamic metadata.

10. The method of claim 9, wherein the static metadata associated with the second adapter of the two or more of the plurality of adapters is indicative of at least one capability of the second adapter, and wherein the dynamic metadata associated with the second adapter of the two or more of the plurality of adapters is indicative of at least one capability of an application associated with the second adapter.

11. A non-transitory computer readable storage medium, having instructions there for identifying capabilities and limitations of an orchestration based application integration, which when read and executed cause a computer to perform steps comprising:
- providing a computer including one or more microprocessors;
- providing an integration platform running on the computer;
- providing an interface running on the computer, wherein the interface is associated with the integration platform;
- providing, by the integration platform, a plurality of adapters, each adapter being associated, respectively, with a set of metadata, each set of metadata indicating at least one capability of the respective adapter;
- providing an orchestration, the orchestration comprising two or more of the plurality of adapters arranged in an integration flow, wherein each adapter of the two or more of the plurality of adapters is associated respectively with an instance of an application of a plurality of applications, each of the applications being external to the orchestration;
- associating the orchestration with a combined set of metadata, the combined set of metadata associated with the orchestration being a combination of each respective set of metadata associated with each of the adapters of the two or more of the plurality of adapters arranged in the integration flow, the combined set of metadata indicating at least one limitation of the integration flow, the at least one limitation being based upon a lowest common denominator between the combination of each respective set of metadata associated with the two or more of the plurality of adapters arranged in the integration flow;
- publishing the combined set of metadata associated with the orchestration via the interface;
- detecting a change in a set of metadata associated with a first adapter of the two or more of the plurality of adapters, the change being detected in a dynamic metadata of the set of metadata of the first adapter of the two or more of the plurality of adapters, the change being based upon an update to a capability of an instance of an application associated with the first adapter of the two or more of the plurality of adapters;
- based upon the detection of the change in the respective set of metadata associated with the first adapter of the two or more of the plurality of adapters, updating the combined set of metadata; and
- republishing the updated combined set of metadata via the interface.

12. The non-transitory computer readable storage medium of claim 11, wherein the set of metadata associated with the first adapter of the two or more of the plurality of adapters further comprises static metadata.

13. The non-transitory computer readable storage medium of claim 12, wherein the static metadata is indicative of at least one capability of the first adapter.

14. The non-transitory computer readable storage medium of claim 13, wherein a second set of metadata associated with a second adapter of the two or more of the plurality of adapters comprises static metadata and dynamic metadata; and
- wherein the static metadata associated with the second adapter of the two or more of the plurality of adapters is indicative of at least one capability of the second adapter, and wherein the dynamic metadata associated with the second adapter of the two or more of the plurality of adapters is indicative of at least one capability of an application associated with the second adapter.

\* \* \* \* \*